(No Model.)

S. Q. DUNCAN.
DOUGH RAISER AND FRUIT DRIER.

No. 526,028. Patented Sept. 18, 1894.

WITNESSES:

INVENTOR:
Samuel Q. Duncan
BY
Eugene L. Arnott,
ATTORNEY.

UNITED STATES PATENT OFFICE.

SAMUEL Q. DUNCAN, OF GREENFIELD, OHIO.

DOUGH-RAISER AND FRUIT-DRIER.

SPECIFICATION forming part of Letters Patent No. 526,028, dated September 18, 1894.

Application filed September 19, 1893. Serial No. 485,812. (No model.)

*To all whom it may concern:*

Be it known that I, SAMUEL Q. DUNCAN, a citizen of the United States, residing at Greenfield, in the county of Highland and State of Ohio, have invented certain new and useful Improvements in Dough-Raisers and Fruit-Driers, of which the following is a specification, reference being had to the accompanying drawings.

This invention relates to dough raisers and fruit driers, and its object is to produce an improved article of the character described, that will be simple and cheap in construction, and may be used with good results in either warm or cold weather.

The novelty of the invention will be hereinafter fully set forth, and specifically pointed out in the claims.

Figure 1:
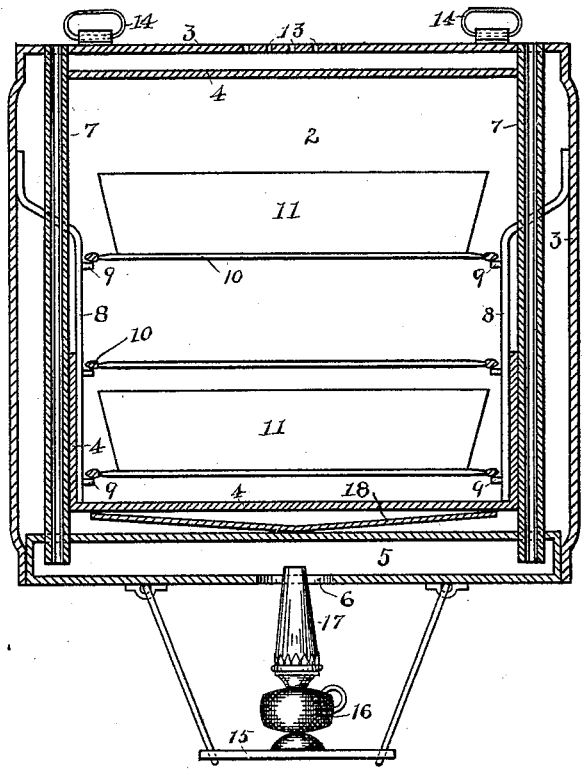
Figure 2:
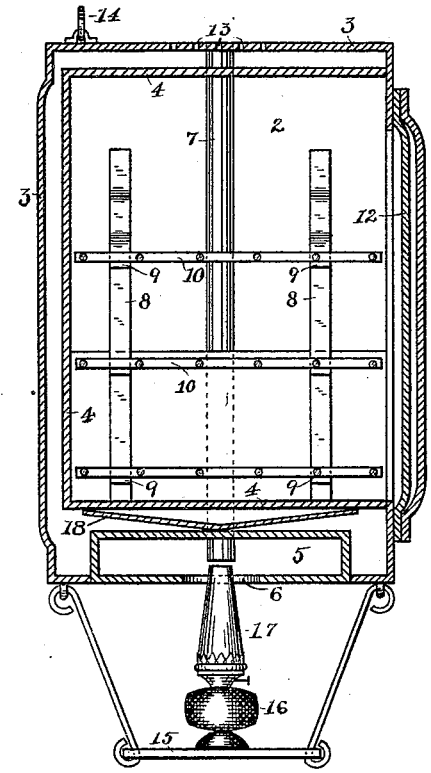
Figure 3:
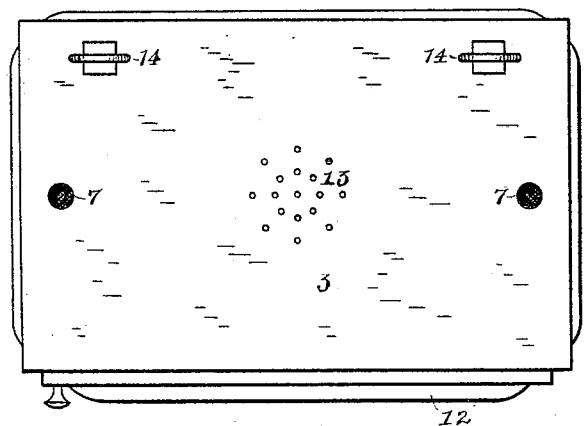

In the accompanying drawings Figure 1 is a central vertical section of a dough raiser and fruit drier embodying my invention. Fig. 2 is a central vertical cross-section of the same. Fig. 3 is a top or plan view.

In the drawings the dough raising and fruit drying chamber, represented by the numeral 2, has a casing 3, and an inner casing or partial casing 4. The casing is preferably made of tin or sheet metal. There is a shallow chamber or compartment 5 immediately beneath the chamber 2. This compartment 5 is preferably closed up completely and made air-tight with the exception that it has an opening 6 in the central portion of its bottom or under side, to receive the lamp chimney, and it also receives the pipes 7 7. These pipes, however, are securely attached (preferably by soldering) to the top or upper side of said compartment 5 with an air-tight juncture. Said pipes begin at points near the bottom of compartment 5, for the purpose hereinafter set forth, and pass up through the top of said compartment, being secured thereto, as stated, and extend up through chamber 2, passing up through the top of said chamber, as shown. These pipes are placed one at either end of chamber 2.

The inner casing or partial casing 4 has its bottom, top, and rear wall complete, while the side walls extend up only a short distance, as shown, and the front wall is entirely lacking. A shield or heat distributer 18, made in the form of a low inverted pyramid, is placed below the bottom of casing 4, and rests upon the top of compartment 5.

Iron straps 8 8 are placed at either end of chamber 2, and these straps have inward lugs or projections 9 9 to support the grated frames 10, upon which rest the dough-pans 11. Chamber 2 has a door 12, and this door is made double or of two plies of metal with an air-space between them. In the central portion of the top or upper side of casing 3 are a number of small ventilating holes or perforations 13. To the top of casing 3, near the rear side, the rings or handles 14 are attached. A bracket or rest 15 is suspended beneath the compartment 5, to support the lamp 16. The lamp-chimney 17 enters the opening 6 in compartment 5, as shown.

With the construction herein shown and described the lamp is lighted, and the heated gaseous air enters compartment 5 and passes up through pipes 7 7 to the open air above. Said pipes extend to points near the bottom of compartment 5, in order that the heated air, which naturally rises to the top of said compartment, may not escape too rapidly through the pipes. The shield or heat distributer 18 has its central portion lower than its edge portions, and by this means it distributes the rising air (heated through the metallic top of compartment 5) to opposite sides of chamber 2. The bottom of inner casing 4 also prevents direct radiation from compartment 5, and assists in distributing the heat. The heated air in chamber 2 escapes slowly through the ventilating holes 13, thus purifying the air in said chamber.

The flame of the lamp should be turned higher in cold weather, and lower in warm weather, and by this means the temperature in chamber 2 may be kept at the proper degree.

The bread raiser and fruit drier may be hung up, by means of rings 14, on nails or pegs in the wall of a room, and thus be placed conveniently out of the way.

When not in use for other purposes the chamber 2 may be used for storing bread, cake, &c. It is well known that bread may be kept fresh and moist for several days in a box made of tin or similar metal.

When fruit is to be dried it is placed in pans 11, and the lamp 16 is lighted, bringing the temperature of chamber 2 to the proper degree of heat for drying fruit.

In extreme cold weather bottles containing liquid and other articles likely to be injured by freezing may be placed in chamber 2, and the temperature of the chamber controlled by lamp 16. It will be obvious from the foregoing description that my invention is very serviceable, and may be kept in constant demand.

Having thus described my invention, what I claim as new, and desire to secure by Letters Patent, is—

1. The combination, with the chamber 2, of a compartment 5 beneath said chamber 2, and a pipe or pipes extending up through the top of said compartment 5 from a point or points near the bottom of said compartment, substantially as set forth.

2. The combination, with the chamber 2, of a compartment 5 beneath said chamber 2, said compartment 5 having an opening in its bottom or under side to receive the lamp chimney, and a pipe or pipes extending up through said compartment 2 from a point or points near the bottom of said compartment 5, substantially at set forth.

In testimony whereof I affix my signature in presence of two witnesses.

SAMUEL Q. DUNCAN.

Witnesses:
WM. H. ECKMAN,
EUGENE L. ARNOTT.